United States Patent [19]

Kechkaylo

[11] Patent Number: 5,446,421
[45] Date of Patent: Aug. 29, 1995

[54] LOCAL OSCILLATOR PHASE NOISE CANCELLING MODULATION TECHNIQUE

[75] Inventor: David L. Kechkaylo, Solvay, N.Y.

[73] Assignee: Thomson Consumer Electronics, Inc., Indianapolis, Ind.

[21] Appl. No.: 190,793

[22] Filed: Feb. 2, 1994

[51] Int. Cl.6 ............... H04L 27/12; H04L 27/152
[52] U.S. Cl. ......................... 332/100; 329/302; 329/313; 329/316; 329/325; 329/327; 332/112; 332/119; 375/272; 375/278; 375/306; 375/307; 375/327; 375/334; 455/102; 455/110; 455/260
[58] Field of Search ............... 329/313, 314, 316, 325, 329/326, 327, 302; 332/112, 113, 119, 100, 101, 102; 455/42, 59, 60, 102, 110, 214, 260, 337; 375/45, 51, 62, 65, 80, 81, 88, 66

[56] References Cited

U.S. PATENT DOCUMENTS

| | | | |
|---|---|---|---|
| 2,957,953 | 10/1960 | Woodward | 455/59 X |
| 3,084,329 | 4/1963 | Clay | 329/316 X |
| 3,873,931 | 3/1975 | Basse et al. | 329/325 X |

*Primary Examiner*—Siegfried H. Grimm
*Attorney, Agent, or Firm*—Joseph S. Tripoli; Peter M. Emanuel; Thomas F. Lenihan

[57] ABSTRACT

A data transmission system includes a source of a data signal and a modulator, responsive to the data signal, producing a first modulated signal representing the data signal and a second modulated signal representing a signal 180 out-of-phase with the data signal. The first and second modulated signals are transported via a transmission channel. A first demodulator demodulates the transported first modulated signal and a second demodulator demodulates the transported second modulated signal. A subtractor, responsive to the first and second demodulators, produces a signal representative of the data signal.

14 Claims, 1 Drawing Sheet

LOCAL OSCILLATOR PHASE NOISE CANCELLING MODULATION TECHNIQUE

The present invention relates to a modulation technique which provides cancellation of local oscillator phase noise.

BACKGROUND OF THE INVENTION

In any data transmission system, it is desirable to maximize the ultimate signal-to-noise ratio (SNR). The primary noise source in a transmission carrier data transmission system that limits this SNR has been found to be phase instability in the local oscillators (LOs) both in the transmitter modulator and in the receiver demodulator. One technique for improving the ultimate SNR by minimizing the phase instability is to use more precisely controlled LOs. Such LOs use more complex circuitry and higher quality parts in their construction to produce a signal having a more stabilized phase characteristic. However, such LOs cost more due to the complex circuitry and higher quality components. It is, of course, desirable to minimize the cost of such a system, especially in consumer electronic equipment. Thus, a modulation technique is desirable which can improve the ultimate SNR in the presence of LO phase instability, without requiring the use of expensive higher quality circuitry and components.

BRIEF SUMMARY OF THE INVENTION

In accordance with principles of the present invention, a data transmission system includes a source of a data signal and a modulator, responsive to the data signal, producing a first modulated signal representing the data signal and a second modulated signal representing a signal 180° out-of-phase with the data signal. The first and second modulated signals are transported via a transmission channel. A first demodulator demodulates the transported first modulated signal and a second demodulator demodulates the transported second modulated signal. A subtractor, responsive to the first and second demodulators, produces a signal representative of the data signal.

DETAILED DESCRIPTION OF THE DRAWING

Figure 1:
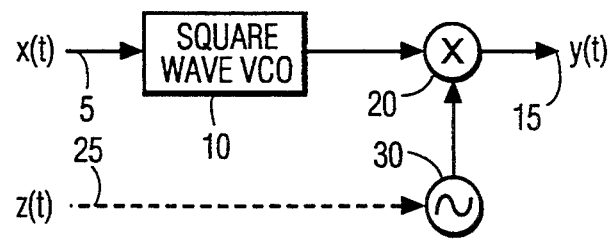
FIG. 1 is a block diagram of a transmitter in accordance with the present invention.

FIG. 1 is a block diagram of a data transmitter in accordance with the present invention. In FIG. 1, a source of a data signal x(t) (not shown) is coupled to an input terminal 5 of the data transmitter. Input terminal 5 is coupled to a frequency control input terminal of a square wave voltage controlled oscillator (VCO) 10. An output terminal of VCO 10 is coupled to a first input terminal of a mixer 20. An output terminal of mixer 20 is coupled to an output terminal 15 of the data transmitter. The output terminal 15 is coupled to the near end of a transmission channel (not shown) which may include radio frequency or optical transmission, or any other transmission method for transporting the signal at output terminal 15 to a receiver (described in more detail below). A transmission carrier local oscillator (LO) 30 is coupled to a second input terminal of mixer 20.

Figure 2:
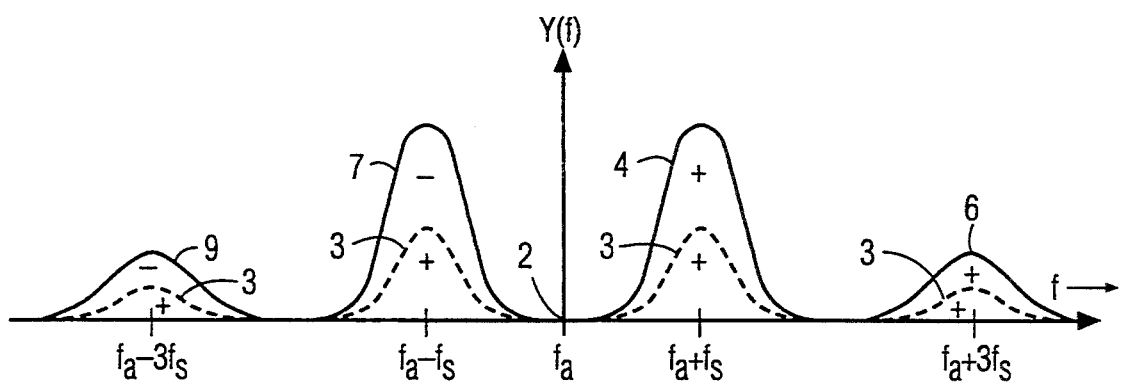
FIG. 2 is a frequency diagram of the spectrum produced by the transmitter illustrated in FIG. 1.

FIG. 2 is a frequency diagram useful in understanding the operation of the transmitter illustrated in FIG. 1. It is known that the two-sided spectrum of a square wave of frequency $f_s$ consists of a fundamental component at frequencies $\pm f_s$ and further components at odd harmonics of the fundamental frequency $f_s$, e.g. $\pm 3f_s$, $\pm 5f_s$..., having decreasing amplitudes. In addition, it is known that corresponding portions of the positive and negative spectra are 180° out-of-phase with each other. In operation, data signal x(t) frequency modulates the square wave signal produced by the VCO 10. Each component of the square wave acts as an FM carrier which is modulated by the data signal x(t) and carries, by itself, all the information from x(t). The maximum frequency deviation for the FM modulation is selected such that the sidebands around the respective square wave components are relatively narrow, and do not overlap each other.

The FM modulated square wave signal, including all of the sideband components described above, is then up-converted in a known manner by mixer 20 and LO 30 to a transmission carrier frequency $f_a$. The spectrum Y(f) of this signal, illustrated in FIG. 2, is centered around frequency $f_a$ 2. In the upper sideband, a first band of energy 4, is centered around $f_a + f_s$ and a second band of energy 6 is centered around $f_a + 3f_s$. In the lower sideband, a first band of energy 7 is centered around $f_a - f_s$ and a second band of energy 9 is centered around $f_a - 3f_s$. Other energy bands are present, but not illustrated. Energy bands 4 and 7, and energy bands 6 and 9 are 180° out-of-phase with each other, respectively. This is illustrated by a "+" sign under energy bands 4 and 6, and a "−" sign under energy bands 7 and 9. The "+" and "−" signs are meant only to indicate the 180° phase difference between the signals represented by corresponding frequency bands, and are not meant to indicate any absolute arithmetic relationship.

The FM modulated square wave signal, made up of all the sideband components (4–9 of FIG. 2), is up-converted as a single unit, in mixer 20. Thus, any phase instability in the carrier signal produced by the LO 30 will affect each sideband component in the FM modulated square wave signal in exactly the same manner. The noise resulting from any phase instability in the LO 30 is manifested as phase modulation of the sideband set making up the FM modulated square wave signal. Each sideband component will be phase modulated in the same manner, thus, the phase modulation will be in-phase in all energy bands (4–9) of both the upper and lower sidebands. This phase instability in the LO 30 results in noise in the modulated signal, lowering the SNR.

Figure 3:
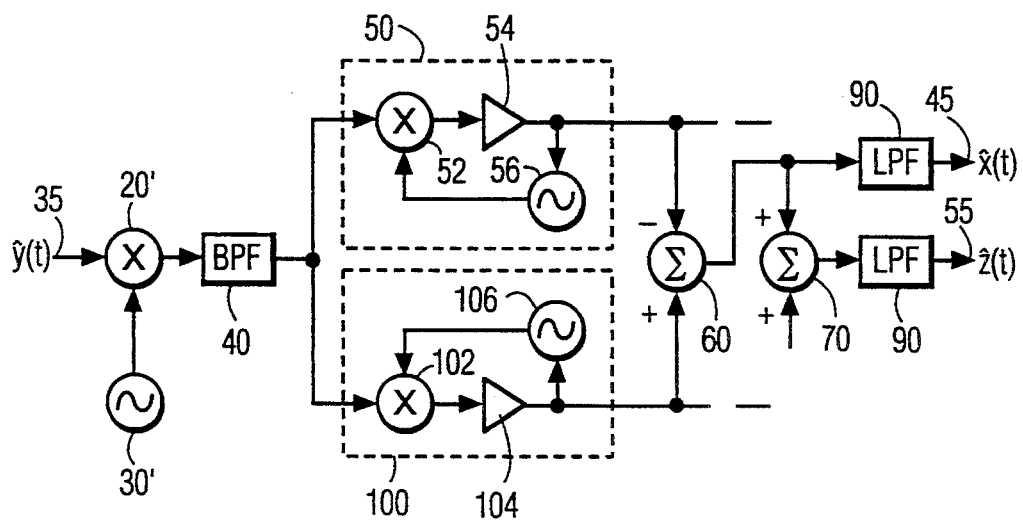
FIG. 3 is a block diagram of a receiver in accordance with the present invention which may be used in conjunction with the transmitter illustrated in FIG. 1.

FIG. 3 is a block diagram of a data receiver corresponding to the transmitter illustrated in FIG. 1. In FIG. 3, the far end of the transmission channel (not shown) is coupled to an input terminal 35 of the data receiver. Input terminal 35 is coupled to a first input terminal of a mixer 20'. An intermediate frequency (IF) LO 30' is coupled to a second input terminal of mixer 20'. An output terminal of mixer 20' is coupled to an input terminal of a bandpass filter (BPF) circuit 40. An output terminal of BPF 40 is coupled to respective input terminals of a first phase locked loop 50, consisting of a known arrangement of a phase detector 52, a loop filter 54 and voltage controlled oscillator 56; and a second phase locked loop 100, consisting of a known arrangement of a phase detector 102, loop filter 104 and voltage controlled oscillator 106. An output terminal of the first phase locked loop 50 is coupled to an inverting input terminal of a summer 60, and an output terminal of the second phase locked loop 100 is coupled to a non-inverting input terminal of summer 60. An output terminal of summer 60 is coupled to an input terminal of a low pass filter (LPF) 80. An output terminal of LPF 80 is coupled to an output terminal 45 of the data receiver 45. Output terminal 45 of the data receiver is coupled to utilization circuitry (not shown) for the transported data signal (t).

In operation, input terminal 35 receives the transmitted modulated signal (t) and down-converts it from around the transmission carrier frequency $f_a$ to an IF frequency $f_b$, using mixer 20' and IF LO 30' which has a frequency of $f_a - f_b$. The spectrum of this down-converted signal is identical to that illustrated in FIG. 2 except that the center frequency 2 is $f_b$, instead of $f_a$ as illustrated. Thus, the IF sideband corresponding to sideband 4 is centered at $f_b + f_s$, and the IF sideband corresponding to sideband 7 is centered at $f_b - f_s$, etc.

Bandpass filter 40 has a center frequency of $f_b$ and the appropriate bandwidth to pass only sidebands 4 and 7. As stated above, each of these sidebands, by itself, represents the FM modulated data signal x(t). The VCO 56 of PLL 50 has a center frequency of $f_b + f_s$, and PLL 50 detects and demodulates the data signal carried by the upper sideband 4. The VCO 106 of PLL 100 has a center frequency $f_b - f_s$, and PLL 100 detects and demodulates the data signal carried by the lower sideband 7. Summer 60 operates as a subtractor. Because the detected data signals from PLL 50 and PLL 100 are 180° out-of-phase (as described above), they reinforce at the output of the summer; and because any phase noise introduced by both the transmitter LO 30 and the receiver LO 30' is in-phase in sidebands 4 and 7 (as described above), this noise component is canceled at the output of summer 60. The LPF produces the received, noise canceled, data signal (t).

The system above has been described as an LO phase noise cancelling system, however, the same system may be used to transmit two data signals, with minor modifications. In FIG. 1, a source of a second data signal z(t) is coupled to a second input terminal 25 of the data transmitter. Input terminal 25 is coupled to a frequency control input terminal of LO 30, as shown in phantom. The second data signal FM modulates the LO signal. The remainder of the transmitter operates in the manner described above. The spectrum resulting from the second FM modulated data signal is illustrated in phantom in FIG. 2. As can be seen, each sideband (4–9) is a composite signal which includes a component 3 of the FM modulated second data signal. The data signal represented by this component is in-phase in all sidebands (4–9). This is illustrated in FIG. 2 by a "+" sign under the component 3 of the FM modulated second data signal in all the energy bands 4–9, in a similar manner as described above for those energy bands.

The receiver of FIG. 3 operates in the manner described above to produce received, LO phase noise canceled, data signal (t) from which the second data signal has also been canceled. In addition, the output terminals of both PLL 50 and PLL 100 are coupled to respective non-inverting input terminals of summer 70, as shown in phantom. Because the first data signals from PLLs 50 and 100 are 180° out-of-phase (as described above), they cancel at the output of summer 70. However, because the second data signals from PLLs 50 and 100, and any LO phase noise component, are in-phase, they reinforce at the output of summer 70. A low pass filter (LPF) 90, is coupled to the output terminal of summer 70, as shown in phantom, and passes the received second data signal (t), and the LO phase noise component.

There is no LO phase noise cancellation in the second data signal path. Thus, for data signals requiring higher SNRs, higher quality LOs must be used. Alternatively, the second data signal path may be used only for signals which can be used in the presence of a lower ultimate SNR.

What is claimed is:
1. A data transmission system, comprising:
a source of a data signal, said data signal exhibiting first and second levels;
a voltage controlled square wave oscillator, having a frequency control input terminal coupled to said data signal source, said voltage controlled square wave oscillator producing an output signal at a first frequency in response to said first level of said data signal and a second frequency in response to said second level of said data signal;
a modulator, responsive to said output signal, producing a first modulated signal representing said data signal, and a second modulated signal representing a signal 180° out-of-phase wih said data signal, said first and second modulated signals having the same polarity;
said first modulated signal having frequency deviations in first and second directions in response to said output signal, said second modulated Signal having opposite frequency deviations in response to said output signal;
said modulator including an oscillator subject to undesired phase deviation, said phase deviation affecting said first and second modulated signals by introducing phase error into each of said first and second modulated signals in the same direction;
a transmission channel, transporting said first and second modulated signals;
a first demodulator, coupled to said transmission channel, demodulating said transported first modulated signal and producing said data signal and a noise signal caused by said phase error;
a second demodulator, coupled to said transmission channel, demodulating said transported second modulated signal and producing said data signal 180° out-of-phase with said data signal and said noise signal caused by said phase error;
a subtractor, coupled to said first and second demodulators, producing a signal representative of said data signal and cancelling said noise signal.

2. The system of claim 1, wherein:
said modulator produces said first and second modulated signal as FM modulated; and
each of said first and second demodulators include a phase locked loop FM detector; and each phase locked loop FM detector includes,
a phase detector, having a first input terminal responsive to the transported modulated signal, and a second input terminal;
a loop filter, coupled to said phase detector, producing a demodulated data signal; and
a voltage controlled oscillator, having a frequency control input terminal coupled to said loop filter and an output terminal coupled to said second input terminal of said phase detector.

3. The system of claim 2, wherein:

said modulator produces said first FM modulated signal centered at a first frequency and said second FM modulated signal centered at a second frequency;

the center frequency of said voltage controlled oscillator of said first demodulator is said first frequency; and the center frequency of said voltage controlled oscillator of said second demodulator is said second frequency.

4. The system of claim 1, further comprising a low pass filter, coupled to said subtractor, for passing said data signal representative signal.

5. The system of claim 1, further comprising the serial connection, coupled between said transmission channel and said first and second demodulators, of:

a down converter translating said transported first and second modulated signals to respective first and second intermediate frequencies; and a bandpass filter having a passband passing said translated first and second modulated signals.

6. A data transmission system, comprising:

a source of a data signal;

a modulator, responsive to said data signal, producing a first modulated signal representing said data signal, and a second modulated signal representing a signal 180° out-of-phase with said data signal;

a transmission channel, transporting said first and second modulated signals;

a first demodulator, coupled to said transmission channel, demodulating said transported first modulated signal;

a second demodulator, coupled to said transmission channel, demodulating said transported second modulated signal;

a subtractor, coupled to said first and second demodulators, producing a signal representative of said data signal; and further comprising the serial connection, coupled between said transmission channel and said first and second demodulators, of:

a down converter translating said transported first and second modulated signals to respective first and second intermediate frequencies; and a bandpass filter having a passband passing said translated first and second modulated signals;

wherein said modulator comprises a voltage controlled square wave oscillator having a frequency control input terminal coupled to said data signal source; wherein said modulator further comprises an up-converter, coupled to said square wave oscillator.

7. A data receiver, comprising:

a source of a first modulated signal representing a data signal, and a second modulated signal representing a signal 180° out-of-phase with said data signal, said first and second modulated signals having the same polarity;

said first modulated signal having frequency deviations in first and second directions in response to said data signal, said second modulated signal having opposite frequency deviations in response to said data signal;

said first and second modulated signals each exhibiting an undesired phase error deviating in the same direction;

a first demodulator demodulating said first modulated signal and producing said data signal and a noise signal caused by said phase error;

a second demodulator demodulating said second modulated signal and producing said data signal 180° out-of-phase with said data signal and said noise signal caused by said phase error; and a subtractor, responsive to said first and second demodulators, producing a signal representative of said data signal and cancelling said noise signal.

8. The receiver of claim 7, wherein said source comprises:

a down-converter, responsive to said first and second modulated signals, translating said first and second modulated signals to respective first and second intermediate frequencies; and a bandpass filter, coupled to said down-converter, having a passband passing said translated first and second modulated signals, said bandpass filter having an output coupled to inputs of said first and second demodulators.

9. The receiver of claim 8, wherein:

said source produces said first and second modulated signal as FM modulated;

each of said first and second demodulators includes a phase locked loop FM detector, including:

a phase detector, having a first input terminal coupled to said bandpass filter, and a second input terminal;

a loop filter, coupled to said phase detector, producing a demodulated data signal; and a voltage controlled oscillator, having a frequency control input terminal coupled to said loop filter and an output terminal coupled to said second input terminal of said phase detector;

the center frequency of said voltage controlled oscillator of said first demodulator is said first intermediate frequency; and the center frequency of said voltage controlled oscillator of said second demodulator is said second intermediate frequency.

10. A data transmitter producing a first modulated signal representing a data signal and a second modulated signal representing a signal 180° out-of-phase with said data signal, comprising:

a source of said data signal; and a voltage controlled square wave oscillator, having a frequency control input terminal coupled to said data signal source.

11. The transmitter of claim 10, further comprising an up-converter, coupled to said square wave oscillator; and said up-converter includes, a transmitter local oscillator; and a mixer, coupled to said square wave oscillator and said local oscillator, producing said first and second modulated signals.

12. A dual data signal transmission system, comprising:

a source of a first data signal;

a source of a second data signal;

a modulator, responsive to said first and second data signals, producing a first modulated signal representing a composite of said first and second data signals, and a second modulated signal representing a composite of said second data signal and a signal 180 out-of-phase with said first data signal;

a transmission channel, transporting said first and second composite modulated signals;

a first demodulator, coupled to said transmission channel, demodulating said transported first composite modulated signal;

a second demodulator, coupled to said transmission channel, demodulating said transported second composite modulated signal;

a subtractor, coupled to said first and second demodulators, producing a signal representative of said first data signal; and an adder, coupled to said first and second demodulators producing a signal representative of said second data signal.

13. A data receiver, comprising:

a source of a first modulated signal representing a composite of a first and a second data signal, and a second modulated signal representing a composite of said second data signal and a signal 180 out-of-phase with said first data signal;

a first demodulator demodulating said first composite modulated signal;

a second demodulator demodulating said second composite modulated signal;

a subtractor, coupled to said first and second demodulators, producing a signal representative of said first data signal; and an adder, coupled to said first and second demodulators producing a signal representative of said second data signal.

14. The receiver of claim 13 wherein said source comprises:

a down-converter, responsive to said first and second composite modulated signals, translating said first and second modulated signals to respective first and second intermediate frequencies;

a bandpass filter, coupled to said down-converter, having a passband passing said translated first and second composite modulated signals, said bandpass filter having an output coupled to inputs of said first and second demodulators.

* * * * *